United States Patent
Xu et al.

(10) Patent No.: US 12,134,730 B2
(45) Date of Patent: Nov. 5, 2024

(54) ASPHALT-LIKE MATERIAL AND PREPARATION METHOD AND USE THEREOF AS PLUGGING AGENT, AND WATER-BASED DRILLING FLUID

(71) Applicants: Yangtze University, Hubei (CN); Jingzhou Jiahua Technology Co., Ltd., Hubei (CN)

(72) Inventors: Mingbiao Xu, Jingzhou (CN); Fuchang You, Jingzhou (CN); Kai Jiao, Jingzhou (CN); Shusheng Zhou, Jingzhou (CN)

(73) Assignees: Yangtze University, Jingzhou (CN); Jingzhou Jiahua Technology Co., Ltd., Jingzhou (CN)

( * ) Notice: Subject to any disclaimer, the term of this patent is extended or adjusted under 35 U.S.C. 154(b) by 0 days.

(21) Appl. No.: 18/166,565

(22) Filed: Feb. 9, 2023

(65) Prior Publication Data
US 2024/0101887 A1 Mar. 28, 2024

(30) Foreign Application Priority Data
Sep. 9, 2022 (CN) .......................... 202211100690.9

(51) Int. Cl.
| | |
|---|---|
| C09K 8/42 | (2006.01) |
| C04B 26/26 | (2006.01) |
| C08F 289/00 | (2006.01) |
| C09K 8/24 | (2006.01) |
| C09K 8/44 | (2006.01) |

(52) U.S. Cl.
CPC .............. C09K 8/426 (2013.01); C04B 26/26 (2013.01); C08F 289/00 (2013.01); C09K 8/24 (2013.01); C09K 8/44 (2013.01)

(58) Field of Classification Search
None
See application file for complete search history.

(56) References Cited

U.S. PATENT DOCUMENTS

| | | | | |
|---|---|---|---|---|
| 11,427,748 B2 * | 8/2022 | Dai | .................. | C08F 220/56 |
| 11,834,387 B1 * | 12/2023 | Xu | .................. | C07C 209/12 |
| 2012/0285690 A1 * | 11/2012 | Weaver | .................. | C09K 8/607 |
| | | | | 166/305.1 |
| 2022/0298407 A1 * | 9/2022 | Russell | .................. | C09K 8/524 |

* cited by examiner

*Primary Examiner* — John J Figueroa
(74) *Attorney, Agent, or Firm* — Harness, Dickey & Pierce, P.L.C.

(57) ABSTRACT

Provided are an asphalt-like material and a method and use thereof as a plugging agent, and a water-based drilling fluid. The asphalt-like material has a structure shown in formula I, wherein, in the formula I, $R^1$ is selected from the group consisting of —H, —COOH, and —$CH_2$—COOH; $R^2$ is selected from the group consisting of —NH—$CH_2$—$CH_2$—OH, —NH—$CH_2$—$CH_2$—$NH_2$, —N—($CH_2$—$CH_2$—OH)$_2$, and —NH—$CH_2$—$CH_2$—$CH_2$—OH; $R^3$ is selected from the group consisting of —OH, —NH—$CH_2$—$CH_2$—OH, —NH—$CH_2$—$CH_2$—$NH_2$, —N—($CH_2$—$CH_2$—OH)$_2$, and —NH—$CH_2$—$CH_2$—$CH_2$—OH; $R^4$ is selected from the group consisting of —NH—$CH_2$—$CH_2$—OH, —NH—$CH_2$—$CH_2$—$NH_2$, —N—($CH_2$—$CH_2$—OH)$_2$, and —NH—$CH_2$—$CH_2$—$CH_2$—OH; and n is 370 to 400.

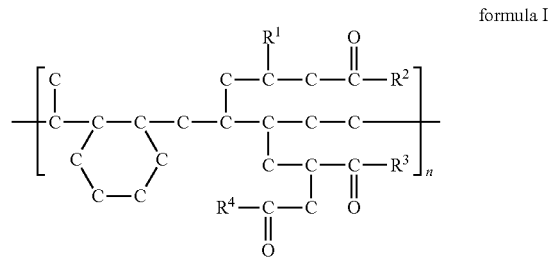

formula I

13 Claims, No Drawings

ASPHALT-LIKE MATERIAL AND PREPARATION METHOD AND USE THEREOF AS PLUGGING AGENT, AND WATER-BASED DRILLING FLUID

CROSS REFERENCE TO RELATED APPLICATION

This patent application claims the benefit and priority of Chinese Patent Application No. 202211100690.9 filed with the China National Intellectual Property Administration on Sep. 9, 2022, the disclosure of which is incorporated by reference herein in its entirety as part of the present application.

TECHNICAL FIELD

The present disclosure relates to the technical fields of petroleum drilling engineering and oilfield chemistry, in particular to an asphalt-like material and a preparation method and use thereof as a plugging agent, and a water-based drilling fluid.

BACKGROUND

With the increasing energy consumption, conventional oil and gas resources could no longer meet energy consumption needs, prompting drilling work to invest in oil and gas resources in complex formations. Drilling in complex formations may bring severe challenges to drilling engineering, which is prone to wellbore wall instability, and even leads to the scrapping of wellbore in severe cases, resulting in huge economic losses. For the existing drilling technology, the wellbore wall instability is a major worldwide problem during the drilling. In particular, the wellbore wall instability is more likely to occur in shale with high clay content. Compared with water-based drilling fluid, oil-based drilling fluid is more suitable for drilling in complex formations, and is conducive to the stability of the wellbore wall. However, the oil-based drilling fluid has prominent problems such as high cost, difficulty in cuttings disposal, and environmental pollution. During the drilling with water-based drilling fluid, under the action of positive drilling pressure difference and capillary force, the drilling fluid filtrate invades the formation along micro-fractures, reducing the strength of formation rock and increasing the probability of wellbore wall instability.

In order to overcome the above problems, the most direct measure is to improve plugging performance of the drilling fluid. Specifically, plugging agents could be added to improve the quality of mud cakes of the drilling fluid and prevent the drilling fluid filtrate from entering the formation; meanwhile, the plugging agents could also be used to bond micro-fractures and reduce the impact of surge pressure from drilling fluid on the wellbore wall stability. At present, asphalt-based plugging agent is recognized as an ideal plugging agent. However, due to the current severe environmental protection situation in oilfields, the plugging agent is generally prohibited due to a high fluorescence level. Based on this, in order to avoid the wellbore wall instability during drilling in complex formations and to meet the environmental protection requirements, it is an urgent problem for researchers to prepare an environmental-friendly and asphalt-like plugging agent that does not contain toxic substances such as aromatic hydrocarbons.

Chinese patent CN109468124B (application number: 201710815622.3) provides an asphalt-like plugging agent. When the asphalt-like plugging agent is adsorbed onto a shale interface, it could prevent the hydration and dispersion of the shale particles, and play a role in preventing collapse. However, the asphalt-like plugging agent contains sulfonic acid groups, showing certain biological toxicity, which cannot meet the environmental protection requirements.

SUMMARY

An object of the present disclosure is to provide an asphalt-like material and a preparation method and use thereof as a plugging agent, and a water-based drilling fluid. In the present disclosure, the asphalt-like material does not contain toxic substances such as aromatic hydrocarbons and sulfonic acid groups, and is environmental-friendly. The asphalt-like material is used as a plugging agent for water-based drilling fluid, showing desirable plugging performance.

To achieve the above object, the present disclosure provides the following technical solutions:

Provided is an asphalt-like material, having a structure shown in formula I:

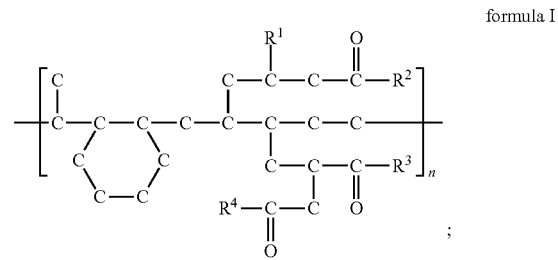

where, in the formula I,
$R^1$ is selected from the group consisting of —H, —COOH, and —CH$_2$—COOH;
$R^2$ is selected from the group consisting of —NH—CH$_2$—CH$_2$—OH, —NH—CH$_2$—CH$_2$—NH$_2$, —N—(CH$_2$—CH$_2$—OH)$_2$, and —NH—CH$_2$—CH$_2$—CH$_2$—OH;
$R^3$ is selected from the group consisting of —OH, —NH—CH$_2$—CH$_2$—OH, —NH—CH$_2$—CH$_2$—NH$_2$, —N—(CH$_2$—CH$_2$—OH)$_2$, and —NH—CH$_2$—CH$_2$—CH$_2$—OH;
$R^4$ is selected from the group consisting of —NH—CH$_2$—CH$_2$—OH, —NH—CH$_2$—CH$_2$—NH$_2$, —N—(CH$_2$—CH$_2$—OH)$_2$, and —NH—CH$_2$—CH$_2$—CH$_2$—OH; and
n is 370 to 400.

In some embodiments, in the formula I, $R^1$ is —COOH, $R^2$ is —NH—CH$_2$—CH$_2$—OH, $R^3$ is —OH, $R^4$ is —NH—CH$_2$—CH$_2$—OH, and n is 370 to 380; alternatively,
in the formula I, $R^1$ is —CH$_2$—COOH, $R^2$ is —NH—CH$_2$—CH$_2$—NH$_2$, $R^3$ is —OH, $R^4$ is —NH—CH$_2$—CH$_2$—NH$_2$, and n is 380 to 390; alternatively,
in the formula I, $R^1$ is —H, $R^2$ is —NH—CH$_2$—CH$_2$—NH$_2$, $R^3$ is —OH, $R^4$ is —N—(CH$_2$—CH$_2$—OH)$_2$, and n is 390 to 400.

Also provided is a method for preparing the asphalt-like material as described above, including the following steps:
mixing a C5 petroleum resin, a double bond-containing compound, and an initiator to obtain a first mixture, and subjecting the first mixture to a graft polymerization to obtain a graft polymer; and mixing the graft polymer with an organic amine to obtain a second mixture, and subjecting the second mixture to an amidation to obtain the asphalt-like material having a structure shown in formula I, where the double bond-containing compound is one or more selected from the group consisting of itaconic acid, acrylic acid and maleic anhydride; and the organic amine is one or more selected from the group consisting of monoethanolamine, ethylenediamine, diethanolamine, and 4-amino-1-butanol.

In some embodiments, a mass ratio of the C5 petroleum resin, the double bond-containing compound, to the organic amine is in the range of (6-7):(2-3):(1-2).

In some embodiments, the initiator is selected from the group consisting of a di-tert-butyl peroxide, 2,2'-azobis[2-methylpropionamidine] dihydrochloride (AMA), and a mixture of $(NH_4)_2S_2O_8$ and $NaHSO_3$; and a mass ratio of the initiator to the C5 petroleum resin is in the range of (0.2-0.5):(60-70).

In some embodiments, the graft polymerization is conducted at a temperature of 120° C. to 140° C. for 5 hours to 7 hours.

In some embodiments, the amidation is conducted at a temperature of 160° C. to 180° C. for 4 hours to 6 hours.

Also provided is use of the asphalt-like material as described above or an asphalt-like material prepared by the method as described above as a plugging agent.

Also provided is a water-based drilling fluid, including water, bentonite, a pH regulator, a polymer viscosifying and filtration additive, a filtrate reducer, an inhibitor, KCl, a plugging agent, and a weighting agent, where the plugging agent is the asphalt-like material as described above or an asphalt-like material prepared by the method as described above.

In some embodiments, based on a mass of water, the bentonite is in an amount of 2.0% to 3.0% by mass, the pH regulator is in an amount of 0.5% to 1.0% by mass, the polymer viscosifying and filtration additive is in an amount of 0.5% to 1.0% by mass, the filtrate reducer is in an amount of 2.0% to 4.0% by mass, the inhibitor is in an amount of 1.0% to 2.0% of by mass, KCl is in an amount of 5.0% to 7.0% by mass, the plugging agent is in an amount of 2.0% to 4.0% by mass, and the weighting agent is in an amount of 45.0% to 80.0% by mass.

In the present disclosure, the asphalt-like material does not contain toxic substances such as aromatic hydrocarbons or sulfonic acid groups, and is environmental-friendly. The asphalt-like material as a plugging agent in the water-based drilling fluid has desirable plugging performance, and could reduce a filtration volume of the water-based drilling fluid under the condition of high-temperature and high-pressure and permeability of a mud cake.

In the present disclosure, the asphalt-like material is prepared by the C5 petroleum resin, the double bond-containing compound, and the organic amine as raw materials. The C5 petroleum resin is an environmental-friendly material, has a structure similar to asphalt and desirable plugging performance, but has poor water solubility and dispersibility. The C5 petroleum resin is modified by water-soluble monomers (the double bond-containing compound and the organic amine), which could effectively improve the dispersibility of the C5 petroleum resin. Therefore, the asphalt-like material not only has the plugging performance similar to asphalt, but also meets the requirements of environmental protection. In addition, the method for preparing the asphalt-like material has simple operations and no need of organic solvents (such as butanone and xylene), and is environmental-friendly.

DETAILED DESCRIPTION OF THE EMBODIMENTS

Provided is an asphalt-like material, having a structure shown in formula I:

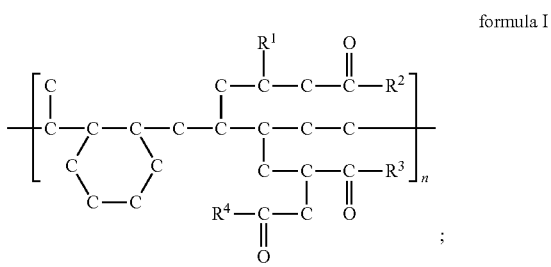

formula I where, in the formula I,
$R^1$ is selected from the group consisting of —H, —COOH, and —$CH_2$—COOH;
$R^2$ is selected from the group consisting of —NH—$CH_2$—$CH_2$—OH, —NH—$CH_2$—$CH_2$—$NH_2$, —N—($CH_2$—$CH_2$—OH)$_2$, and —NH—$CH_2$—$CH_2$—$CH_2$—OH;
$R^3$ is selected from the group consisting of —OH, —NH—$CH_2$—$CH_2$—OH, —NH—$CH_2$—$CH_2$—$NH_2$, —N—($CH_2$—$CH_2$—OH)$_2$, and —NH—$CH_2$—$CH_2$—$CH_2$—OH;
$R^4$ is selected from the group consisting of —NH—$CH_2$—$CH_2$—OH, —NH—$CH_2$—$CH_2$—$NH_2$, —N—($CH_2$—$CH_2$—OH)$_2$, and —NH—$CH_2$—$CH_2$—$CH_2$—OH; and
n is 370 to 400.

In the present disclosure, hydrogen is not represented in the formula I, and four covalent bonds are formed between the carbon atom and other atoms in the formula I. In the formula I, n is 370 to 400, and the asphalt-like material correspondingly has a weight average molecular weight of 60,000 to 100,000. In some embodiments, n is 370 to 380, 380 to 390, or 390 to 400.

In embodiments of the present disclosure, in the formula I, $R^1$ is —COOH, $R^2$ is —NH—$CH_2$—$CH_2$—OH, $R^3$ is —OH, $R^4$ is —NH—$CH_2$—$CH_2$—OH, and n is 370 to 380; alternatively, in the formula I, $R^1$ is —$CH_2$—COOH, $R^2$ is —NH—$CH_2$—$CH_2$—$NH_2$, $R^3$ is —OH, $R^4$ is —NH—$CH_2$—$CH_2$—$NH_2$, and n is 380 to 390; alternatively, in the formula I, $R^1$ is —H, $R^2$ is —NH—$CH_2$—$CH_2$—$NH_2$, $R^3$ is —OH, $R^4$ is —N—($CH_2$—$CH_2$—OH)$_2$, and n is 390 to 400.

Also provided is a method for preparing the asphalt-like material as described above, including the following steps:
mixing a C5 petroleum resin, a double bond-containing compound, and an initiator to obtain a first mixture, and subjecting the first mixture to a graft polymerization to obtain a graft polymer; and
mixing the graft polymer with an organic amine to obtain a second mixture, and subjecting the second mixture to an amidation to obtain the asphalt-like material having a structure shown in formula I,
where the double bond-containing compound is one or more selected from the group consisting of itaconic acid, acrylic acid and maleic anhydride; and the organic amine is one or more selected from the group consisting of monoethanolamine, ethylenediamine, diethanolamine, and 4-amino-1-butanol.

In the present disclosure, unless otherwise specified, all raw materials are commercially available products well known to those skilled in the art.

In the present disclosure, a C5 petroleum resin, a double bond-containing compound, and an initiator are mixed to obtain a first mixture, and the first mixture is subjected to a graft polymerization to obtain a graft polymer. There is no special limitation on the type or index parameters of the C5 petroleum resin, and any C5 petroleum resin well known to those skilled in the art may be used. In an embodiment, the C5 petroleum resin has a model number of FST-A1110 and a softening point of 105° C. to 115° C. In the present disclosure, the double bond-containing compound is one or more selected from the group consisting of itaconic acid, acrylic acid, and maleic anhydride, preferably itaconic acid, maleic anhydride, or a mixture of acrylic acid and maleic anhydride. In some embodiments, in the mixture of acrylic acid and maleic anhydride, a mass ratio of acrylic acid to maleic anhydride is in the range of (1-5):(5-9), preferably 3:7. In some embodiments, a mass ratio of the C5 petroleum resin to the double bond-containing compound is in the range of (6-7):(2-3), preferably 7:3, 6.5:2, or 6:2.5. In some embodiments, the initiator is selected from the group consisting of a di-tert-butyl peroxide, AMA, and a mixture of $(NH_4)_2S_2O_8$ and $NaHSO_3$ (where a molar ratio of $(NH_4)_2S_2O_8$ to $NaHSO_3$ is in the range of (0.5-2):(1-3), preferably 1:2), preferably the di-tert-butyl peroxide. In some embodiments, a mass ratio of the initiator to the C5 petroleum resin is in the range of (0.2-0.5):(60-70), preferably 0.4:70, 0.2:65, or 0.5:60.

In some embodiments, a process of mixing the C5 petroleum resin, the double bond-containing compound, and the initiator includes: mixing the C5 petroleum resin and the double bond-containing compound to obtain a mixed material, heating the mixed material under stirring to a desired temperature for the graft polymerization, and then adding the initiator in a protective atmosphere. There is no special limitation on the type of a protective gas of the protective atmosphere, and any protective gas well known to those skilled in the art may be used, such as nitrogen. In some embodiments, the graft polymerization is conducted at a temperature of 120° C. to 140° C., preferably 120° C., 130° C., or 140° C.; in some embodiments, the graft polymerization is conducted for 5 hours to 7 hours, preferably 5 hours, 6 hours or 7 hours; in some embodiments, the graft polymerization is conducted in the protective atmosphere. Under an action of the initiator, petroleum resin molecular chains in the C5 petroleum resin and the double bond-containing compound undergo the graft polymerization.

In the present disclosure, after the graft polymerization, there is no need for any post-treatment. The obtained graft polymer is directly mixed with an organic amine to obtain a second mixture, and the second mixture is subjected to an amidation to obtain the asphalt-like material having a structure shown in formula I. In some embodiments, the organic amine is one or more selected from the group consisting of monoethanolamine, ethylenediamine, diethanolamine, and 4-amino-1-butanol, preferably monoethanolamine, ethylenediamine, and a mixture of ethylenediamine and diethanolamine; in some embodiments, in the mixture of ethylenediamine and diethanolamine, a mass ratio of ethylenediamine to diethanolamine is in the range of (0.5-2):1, preferably 1:1. In some embodiments, a mass ratio of the organic amine to the C5 petroleum resin is in the range of (1-2):(6-7), preferably 1:7, 1.5:6.5, or 2:6.

In some embodiments, the amidation is conducted at a temperature of 160° C. to 180° C., preferably 160° C., 170° C., or 180° C.; in some embodiments, the amidation is conducted for 4 hours to 6 hours, preferably 4 hours, 5 hours, or 6 hours. After the amidation, the asphalt-like material with a structure shown in formula I could be obtained without any post-treatment.

Also provided is use of the asphalt-like material as described above or an asphalt-like material prepared by the method as described above as a plugging agent.

Also provided is a water-based drilling fluid, including water, bentonite, a pH regulator, a polymer viscosifying and filtration additive, a filtrate reducer, an inhibitor, KCl, a plugging agent, and a weighting agent, where the plugging agent is the asphalt-like material as described above or an asphalt-like material prepared by the method as described above. In some embodiments, based on a mass of water, the bentonite is in an amount of 2.0% to 3.0% by mass, the pH regulator is in an amount of 0.5% to 1.0% by mass, the polymer viscosifying and filtration additive is in an amount of 0.5% to 1.0% by mass, the filtrate reducer is in an amount of 2.0% to 4.0% by mass, the inhibitor is in an amount of 1.0% to 2.0% by mass, KCl is in an amount of 5.0% to 7.0% by mass, the plugging agent is in an amount of 2.0% to 4.0% by mass, and the weighting agent is in an amount of 45.0% to 80.0% by mass. The above components will be specifically described below.

In some embodiments, the water is fresh water or sea water.

In some embodiments, the bentonite accounts for 2.0% to 3.0%, preferably 2.0%, 2.5%, or 3.0% of the mass of water. In some embodiments, the bentonite is sodium bentonite, and the bentonite has a particle size of 50 μm to 70 μm. In the present disclosure, sodium bentonite is preferred, which could make the grid structure of the drilling fluid more stable under high-temperature conditions, and plays a role of increasing viscosity, improving shear strength, and reducing filtration volume.

In some embodiments, the pH regulator accounts for 0.5% to 1.0%, preferably 0.5%, 0.8%, or 1.0% of the mass of water. In some embodiments, the pH regulator is one or more selected from the group consisting of sodium hydroxide, potassium hydroxide, magnesium oxide, magnesium hydroxide, and sodium carbonate, preferably a mixture of potassium hydroxide and sodium carbonate. In some embodiments, in the mixture of potassium hydroxide and sodium carbonate, a mass ratio of potassium hydroxide to sodium carbonate is in the range of (50-60):(40-50), preferably 50:50, 55:45, or 60:40. In some embodiments, the amount of the pH regulator is limited to the above range, so that the resulting water-based drilling fluid has a pH value of 9 to 11, preferably 9, 10, or 11.

In some embodiments, the polymer viscosifying and filtration additive accounts for 0.5% to 1.0%, preferably 0.5%, 0.8%, or 1.0% of the mass of water. In some embodiments, the polymer viscosifying and filtration additive is carboxymethyl cellulose-high viscosity (CMC-HV). In some embodiments, the CMC-HV is used as a polymer viscosifying and filtration additive, which is environmental-friendly and has desirable salt-resistance performance, and could effectively increase viscosity and reduce filtration volume when added in a small amount.

In some embodiments, the filtrate reducer accounts for 2.0% to 4.0%, preferably 2.0%, 3.0%, or 4.0% of the mass of water. In some embodiments, the filtrate reducer is one or more selected from the group consisting of polyanionic cellulose-regular viscosity (PAC-R), sulfomethylated phenolic resin (SMP), and hydroxypropyl starch (HPS), preferably a mixture of PAC-R and HPS; in some embodiments, in the mixture of PAC-R and HPS, a mass ratio of the PAC-R to the HPS is in the range of (40-70):(30-60), preferably 40:60, 50:50, 60:40, or 70:30. In the present disclosure, the filtrate reducer is preferably selected from the above types and proportions, where the PAC-R and the HPS have a synergistic filtration volume control effect and could effectively reduce permeability of the mud cake; moreover, the PAC-R and the HPS are simple to prepare and easy to obtain.

In some embodiments, the inhibitor accounts for of 1.0% to 2.0%, preferably 1.0%, 1.5%, or 2.0% of the mass of water. In some embodiments, the inhibitor is a polyamine inhibitor. In some embodiments, the polyamine inhibitor is selected as the inhibitor, which has multiple amine groups that could be protonated in an aqueous solution, such that the polyamine inhibitor is positively charged, and could be embedded into a clay crystal layer through electrostatic interaction with negative charges on a surface of the clay crystal layer to avoid clay hydration dispersion; moreover, the polyamine inhibitor could be adsorbed on the surface of wellbore rock to stabilize the wellbore wall.

In some embodiments, KCl accounts for 5.0% to 7.0%, preferably 5.0%, 6.0%, or 7.0% of the mass of water. In the present disclosure, KCl could improve the stability and the inhibition performance of the drilling fluid.

In some embodiments, the plugging agent accounts for 2.0% to 4.0%, preferably 2.0%, 3.0%, or 4.0% of the mass of water. In some embodiments, the asphalt-like material of the present disclosure is used as the plugging agent, which has desirable plugging performance, and could reduce filtration volume of the water-based drilling fluid under high-temperature and high-pressure conditions and permeability of a mud cake, and is environmental-friendly.

In some embodiments, the weighting agent accounts for 45.0% to 80.0%, preferably 45.0% to 60.0% of the mass of water. In some embodiments, barite is used as the weighting agent. In some embodiments, the amount of the weighting agent is limited to the above-mentioned range, so that the obtained water-based drilling fluid has a density of 1.3 g/cm$^3$ to 1.4 g/cm$^3$.

The technical solutions of the present disclosure will be clearly and completely described below with reference to the examples of the present disclosure. Apparently, the described examples are only a part of, not all of, the examples of the present disclosure. All other examples obtained by those skilled in the art based on the examples of the present disclosure without creative efforts shall fall within the protection scope of the present disclosure.

In the examples below, the C5 petroleum resin has a model number of FST-A1110 and a softening point of 105° C. to 115° C.

Example 1

A four-neck round-bottomed flask was set up, with a stirrer, a reflux spherical condenser, a thermometer, and a nitrogen inlet-outlet tube. In parts by weight, 70 parts of a C5 petroleum resin and 30 parts of maleic anhydride were added into the four-neck round-bottomed flask, heated to 130° C. with stirring, mixed uniformly, introduced with nitrogen gas for 30 minutes, and added with 0.4 parts of a di-tert-butyl peroxide. The resulting material was subjected to a graft polymerization for 5 hours under heat preservation to obtain a graft polymer. 10 parts of monoethanolamine was added to the graft polymer, and heated to 170° C. with stirring, and the resulting reactant was subjected to an amidation for 5 hours under heat preservation to obtain a plugging agent (denoted as FD-1, where $R^1$ was —COOH, $R^2$ was —NH—CH$_2$—CH$_2$—OH, $R^3$ was —OH, $R^4$ was —NH—CH$_2$—CH$_2$—OH, and n was 370 to 380).

In order to conduct subsequent performance tests to evaluate plugging performance of the plugging agent in a base slurry, in parts by weight, 94 parts of fresh water, 3 parts of sodium bentonite (with a particle size of 50 μm to 70 μm), and 3 parts of the plugging agent (FD-1) were fully mixed to obtain a water-based drilling fluid.

Example 2

A four-neck round-bottomed flask was set up, with a stirrer, a reflux spherical condenser, a thermometer, and a nitrogen inlet-outlet tube. In parts by weight, 65 parts of a C5 petroleum resin and 20 parts of itaconic acid were added into the four-neck round-bottomed flask, heated to 120° C. with stirring, mixed uniformly, introduced with nitrogen gas for 30 minutes, and added with 0.2 parts of a di-tert-butyl peroxide. The resulting material was subjected to a graft polymerization for 6 hours under heat preservation to obtain a graft polymer. 15 parts of ethylenediamine was added to the graft polymer, and heated to 160° C. with stirring, and the resulting reactant was subjected to an amidation for 4 hours under heat preservation to obtain a plugging agent (denoted as FD-2, where $R^1$ was —CH$_2$—COOH, $R^2$ was —NH—CH$_2$—CH$_2$—NH$_2$, $R^3$ was —OH, $R^4$ was —NH—CH$_2$—CH$_2$—NH$_2$, and n was 380 to 390).

In order to conduct subsequent performance tests to evaluate plugging performance of the plugging agent in a base slurry, in parts by weight, 94 parts of fresh water, 3 parts of sodium bentonite (with a particle size of 50 μm to 70 μm), and 3 parts of the plugging agent (FD-2) were fully mixed to obtain a water-based drilling fluid.

Example 3

A four-neck round-bottomed flask was set up, with a stirrer, a reflux spherical condenser, a thermometer, and a nitrogen inlet-outlet tube. In parts by weight, 60 parts of a C5 petroleum resin and 25 parts of a double bond-containing compound (i.e., a mixture of acrylic acid and maleic anhydride with a mass ratio of 3:7) were added into the four-neck round-bottomed flask, heated to 140° C. with stirring, mixed uniformly, introduced with nitrogen gas for 30 minutes, and added with 0.5 parts of a di-tert-butyl peroxide. The resulting material was subjected to a graft polymerization for 7 hours under heat preservation to obtain a graft polymer. 20 parts of an organic amine (i.e., a mixture of ethylenediamine and diethanolamine with a mass ratio of 1:1) was added to the graft polymer, and heated to 180° C. with stirring, and the resulting reactant was subjected to an amidation for 6 hours under heat preservation to obtain a plugging agent (denoted as FD-3, where $R^1$ was —H, $R^2$ was —NH—CH$_2$—CH$_2$—NH$_2$, $R^3$ was —OH, $R^4$ was —N—(CH$_2$—CH$_2$—OH)$_2$, and n was 390 to 400).

In order to conduct subsequent performance tests to evaluate plugging performance of the plugging agent in a base slurry, in parts by weight, 94 parts of fresh water, 3 parts of sodium bentonite (with a particle size of 50 μm to 70 μm), and 3 parts of the plugging agent (FD-3) were fully mixed to obtain a water-based drilling fluid.

Example 4

In this example, a water-based drilling fluid consisting of water, bentonite, a pH regulator, a polymer viscosifying and filtration additive, a filtrate reducer, an inhibitor, KCl, a plugging agent, and a weighting agent was provided.

In the water-based drilling fluid, based on the mass of water, an amount of the bentonite was 2.0% by mass, an amount of the pH regulator was 0.5% by mass, an amount of the polymer viscosifying and filtration additive was 0.8% by mass, an amount of the filtrate reducer was 4.0% by mass, an amount of the inhibitor was 1.5% by mass, an amount of KCl was 5.0% by mass, an amount of the plugging agent was 4.0% by mass, and an amount of the weighting agent was 45.0% by mass In the water-based drilling fluid, the water was fresh water; the bentonite was sodium bentonite, with a particle size of 50 µm to 70 µm; the pH regulator was a mixture of potassium hydroxide and sodium carbonate with a mass ratio of 5:5; the polymer viscosifying and filtration additive was CMC-HV; the filtrate reducer was a mixture of PAC-R and HPS with a mass ratio of 4:6; the inhibitor was a polyamine inhibitor; KCl was commercially available; the plugging agent was the FD-1 prepared in Example 1; and the weighting agent was barite (a commercially available commodity).

In this example, the water-based drilling fluid had a density of 1.3 g/cm$^3$ and a pH value of 9.

Example 5

In this example, a water-based drilling fluid consisting of water, bentonite, a pH regulator, a polymer viscosifying and filtration additive, a filtrate reducer, an inhibitor, KCl, a plugging agent, and a weighting agent was provided;

In the water-based drilling fluid, based on the mass of water, an amount of the bentonite was 2.5% by mass, an amount of the pH regulator was 1.0% by mass, an amount of the polymer viscosifying and filtration additive was 0.5% by mass, an amount of the filtrate reducer was 3.0% by mass, an amount of the inhibitor was 2.0% by mass, an amount of KCl was 6.0% by mass, an amount of the plugging agent was 2.0% by mass, and an amount of the weighting agent was 45.0% by mass.

In the water-based drilling fluid, the water was fresh water; the bentonite was sodium bentonite, with a particle size of 50 µm to 70 µm; the pH regulator was a mixture of potassium hydroxide and sodium carbonate with a mass ratio of 5.5:4.5; the polymer viscosifying and filtration additive was CMC-HV; the filtrate reducer was a mixture of PAC-R and HPS with a mass ratio of 6:4; the inhibitor was a polyamine inhibitor; KCl was commercially available; the plugging agent was the FD-2 prepared in Example 2; and the weighting agent was barite (a commercially available commodity).

In this example, the water-based drilling fluid had a density of 1.3 g/cm$^3$ and a pH value of 11.

Example 6

In this example, a water-based drilling fluid consisting of water, bentonite, a pH regulator, a polymer viscosifying and filtration additive, a filtrate reducer, an inhibitor, KCl, a plugging agent, and a weighting agent was provided.

In the water-based drilling fluid, based on the mass of water, an amount of the bentonite was 3.0% by mass, an amount of the pH regulator was 1.0% by mass, an amount of the polymer viscosifying and filtration additive was 1.0% by mass, an amount of the filtrate reducer was 2.0% by mass, an amount of the inhibitor was 1.5% by mass, an amount of KCl was 7.0% by mass, an amount of the plugging agent was 3.0% by mass, and an amount of the weighting agent was 45.0% by mass.

In the water-based drilling fluid, the water was sea water; the bentonite was sodium bentonite, with a particle size of 50 µm to 70 µm; the pH regulator was a mixture of potassium hydroxide and sodium carbonate with a mass ratio of 6:4; the polymer viscosifying and filtration additive was CMC-HV; the filtrate reducer was a mixture of PAC-R and HPS with a mass ratio of 7:3; the inhibitor was a polyamine inhibitor; KCl was commercially available; the plugging agent was the FD-3 prepared in Example 3; and the weighting agent was barite (a commercially available commodity).

In this example, the water-based drilling fluid had a density of 1.3 g/cm$^3$ and a pH value of 11.

Example 7

In this example, a water-based drilling fluid consisting of water, bentonite, a pH regulator, a polymer viscosifying and filtration additive, a filtrate reducer, an inhibitor, KCl, a plugging agent, and a weighting agent was provided.

In the water-based drilling fluid, based on the mass of water, an amount of the bentonite was 3.0% by mass, an amount of the pH regulator was 0.8% by mass, an amount of the polymer viscosifying and filtration additive was 0.8% by mass, an amount of the filtrate reducer was 2.0% by mass, an amount of the inhibitor was 1.0% by mass, an amount of KCl was 6.0% by mass, an amount of the plugging agent was 3.0% by mass, and an amount of the weighting agent was 60.0% by mass.

In the water-based drilling fluid, the water was sea water; the bentonite was sodium bentonite, with a particle size of 50 µm to 70 µm; the pH regulator was a mixture of potassium hydroxide and sodium carbonate with a mass ratio of 5:5; the polymer viscosifying and filtration additive was CMC-HV; the filtrate reducer was a mixture of PAC-R and HPS with a mass ratio of 5:5; the inhibitor was a polyamine inhibitor; KCl was commercially available; the plugging agent was the FD-3 prepared in Example 3; and the weighting agent was barite (a commercially available commodity).

In this example, the water-based drilling fluid had a density of 1.4 g/cm$^3$ and a pH value of 10.

Comparative Example 1

In parts by weight, 94 parts of fresh water and 6 parts of sodium bentonite (with a particle size of 50 µm to 70 µm) were fully mixed to obtain a water-based drilling fluid.

Comparative Example 2

In parts by weight, 94 parts of fresh water, 3 parts of sodium bentonite (with a particle size of 50 µm to 70 µm), and 3 parts of sulfonated bitumen (FT-1A) were fully mixed to obtain a water-based drilling fluid.

Comparative Example 3

A water-based drilling fluid was prepared according to the method of Example 7, except that sulfonated bitumen (FT-1A) was used instead of the FD-3.

Test Example 1

The biotoxicity of the plugging agents was detected according to GB/T 18420.2-2009 (*Biological toxicity for* pollutants from marine petroleum exploration and exploitation—Part 2: Test method), and the degradation performance of the plugging agents was analyzed according to SY/T 6788-2020 (Evaluation procedures of environmental protection for water-soluble oilfield chemicals). The results are shown in Table 1.

TABLE 1

Evaluation results of environmental protection performance of the plugging agent

| Plugging agent | $LC_{50}$ (mg/L) | $BOD_5/COD_{Cr}$ (%) |
|---|---|---|
| FD-1 | 47890 | 27.3 |
| FD-2 | 43701 | 26.2 |
| FD-3 | 46780 | 25.7 |
| FT-1A | 20680 | 3.5 |

Notes:
the plugging agent was added in an amount of 3.0%; $LC_{50}$ is the half-death concentration of Artemia (mg/L); $COD_{Cr}$ is chemical oxygen demand (mg/L); and $BOD_5$ is biochemical oxygen demand (mg/L).

From Table 1, it can be seen that the plugging agents prepared by the present disclosure all have a $LC_{50}$ of greater than 40,000 mg/L and a $BOD_5/COD_{Cr}$ value of greater than 25%, indicating that the plugging agents have excellent environmental friendliness, while the sulfonated bitumen-based plugging agent is refractory and slightly-toxic.

Test Example 2

The plugging performance of the plugging agent was evaluated by using an OFITE plugging instrument according to standard GB/T 29170-2012 (Petroleum and natural gas industries—Drilling fluids—laboratory testing). Specifically, the water-based drilling fluids in Examples 1 to 7 and Comparative Examples 1 to 3 were subjected to hot-rolling respectively, and poured into a kettle body. Then, an experimental core was placed on the upper end of the kettle body to seal the kettle, and an experimental temperature in the kettle body was set to 120° C. After the temperature rised to 120° C., a pressure in the kettle body was increased to 4.2 MPa, and $N_2$ was introduced thereto to set a back pressure to 0.7 MPa. A filtrate was recovered, and the test was completed after 30 min. A filtrate volume was used to evaluate the plugging performance. The results are shown in Table 2.

TABLE 2

Evaluation results of plugging performance of the plugging agent

| Water-based drilling fluid source | PPT |
|---|---|
| Example 1 | 5.0 |
| Example 2 | 5.4 |
| Example 3 | 4.8 |
| Example 4 | 3.8 |
| Example 5 | 4.2 |
| Example 6 | 3.6 |
| Example 7 | 3.4 |
| Comparative Example 1 | 24.9 |
| Comparative Example 2 | 6.4 |
| Comparative Example 3 | 5.0 |

Notes:
the hot-rolling was conducted at 120° C. for 16 hours; and PPT is the filtration volume (mL) of water-based drilling fluid.

From Table 2, it can be seen that the plugging agents prepared by the present disclosure could effectively reduce the filtration volume of the water-based drilling fluid, and have a plugging effect better than that of the sulfonated bitumen-based plugging agent, showing desirable plugging performance.

Test Example 3

The rheological performance and the filtration volume performance of the water-based drilling fluids in Examples 4 to 7 and Comparative Examples 3 after hot-rolling were evaluated according to the standard GB/T16783.1-2014 (Petroleum and natural gas industries—Field testing of drilling fluids—Part 1: Water-based fluids). The results are shown in Table 3.

TABLE 3

Evaluation results of rheological performance and filtration volume performance of the water-based drilling fluid

| Water-based drilling fluid source | PV | YP | Φ3 | HTHP |
|---|---|---|---|---|
| Example 4 | 28 | 9 | 8 | 5.4 |
| Example 5 | 26 | 6 | 5 | 6.2 |
| Example 6 | 30 | 8 | 7 | 5.0 |
| Example 7 | 32 | 8 | 8 | 5.2 |
| Comparative Example 3 | 30 | 5 | 4 | 7.0 |

Notes:
the hot-rolling was conducted at 120° C. for 16 hours; PV is a plastic viscosity of the drilling fluid (mPa · s); YP is a dynamic shear force of the drilling fluid (Pa); Φ3 is a 3-turn reading of a six-speed rotary viscometer (dimensionless); and HTHP is a water loss (mL) of the drilling fluid under high temperature and high pressure (3.5 MPa, 120° C., 30 minutes).

From Table 3, it can be seen that the plugging agents prepared by the present disclosure have stable performance after being added to the water-based drilling fluid, have desirable rheological performance, and have low water loss under high temperature and high pressure conditions, where the water loss under high temperature and high pressure conditions of the plugging agents of the present disclosure is lower than that of Comparative Example 3, showing that the asphalt-like material of the present disclosure as a plugging agent has better plugging performance than that of the sulfonated bitumen-based plugging agent, which could effectively reduce the permeability of the mud cake.

The above descriptions are merely preferred implementations of the present disclosure. It should be noted that those skilled in the art may further make several improvements and modifications without departing from the principle of the present disclosure, but such improvements and modifications should be deemed as falling within the protection scope of the present disclosure.

What is claimed is:
1. An asphalt-like material, having a structure shown in formula I:

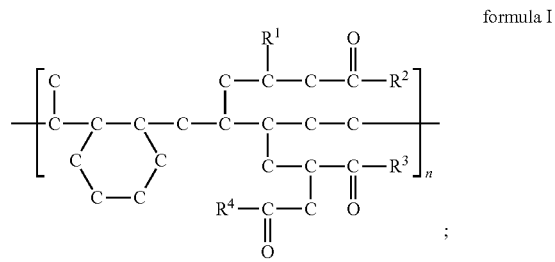

formula I wherein, in the formula I, $R^1$ is selected from the group consisting of —H, —COOH, and —CH$_2$—COOH;

$R^2$ is selected from the group consisting of —NH—CH$_2$—CH$_2$—OH, —NH—CH$_2$—CH$_2$—NH$_2$, —N—(CH$_2$—CH$_2$—OH)$_2$, and —NH—CH$_2$—CH$_2$—CH$_2$—OH;

$R^3$ is selected from the group consisting of —OH, —NH—CH$_2$—CH$_2$—OH, —NH—CH$_2$—CH$_2$—NH$_2$, —N—(CH$_2$—CH$_2$—OH)$_2$, and —NH—CH$_2$—CH$_2$—CH$_2$—OH;

$R^4$ is selected from the group consisting of —NH—CH$_2$—CH$_2$—OH, —NH—CH$_2$—CH$_2$—NH$_2$, —N—(CH$_2$—CH$_2$—OH)$_2$, and —NH—CH$_2$—CH$_2$—CH$_2$—OH; and n is 370 to 400.

2. The asphalt-like material of claim 1, wherein in the formula I, $R^1$ is —COOH, $R^2$ is —NH—CH$_2$—CH$_2$—OH, $R^3$ is —OH, $R^4$ is —NH—CH$_2$—CH$_2$—OH, and n is 370 to 380; or in the formula I, $R^1$ is —CH$_2$—COOH, $R^2$ is —NH—CH$_2$—CH$_2$—NH$_2$, $R^3$ is —OH, $R^4$ is —NH—CH$_2$—CH$_2$—NH$_2$, and n is 380 to 390; or in the formula I, $R^1$ is —H, $R^2$ is —NH—CH$_2$—CH$_2$—NH$_2$, $R^3$ is —OH, $R^4$ is —N—(CH$_2$—CH$_2$—OH)$_2$, and n is 390 to 400.

3. A method for preparing the asphalt-like material of claim 1, comprising the following steps:

mixing a C5 petroleum resin, a double bond-containing compound, and an initiator to obtain a first mixture, and subjecting the first mixture to a graft polymerization to obtain a graft polymer; and mixing the graft polymer with an organic amine to obtain a second mixture, and subjecting the second mixture to an amidation to obtain the asphalt-like material having a structure shown in formula I, wherein the double bond-containing compound is one or more selected from the group consisting of itaconic acid, acrylic acid and maleic anhydride; and the organic amine is one or more selected from the group consisting of monoethanolamine, ethylenediamine, diethanolamine, and 4-amino-1-butanol.

4. The method of claim 3, wherein a mass ratio of the C5 petroleum resin, the double bond-containing compound, and the organic amine is in the range of (6-7):(2-3):(1-2).

5. The method of claim 3, wherein the initiator comprises one selected from the group consisting of a di-tert-butyl peroxide, 2,2'-azobis[2-methylpropionamidine] dihydrochloride (AIBA), and a mixture of (NH$_4$)$_2$S$_2$O$_8$ and NaHSO$_3$; and a mass ratio of the initiator to the C5 petroleum resin is in the range of (0.2-0.5):(60-70).

6. The method of claim 3, wherein the graft polymerization is conducted at a temperature of 120° C. to 140° C. for 5 hours to 7 hours.

7. The method of claim 3, wherein the amidation is conducted at a temperature of 160° C. to 180° C. for 4 hours to 6 hours.

8. The method of claim 3, wherein, in the formula I, $R^1$ is —COOH, $R^2$ is —NH—CH$_2$—CH$_2$—OH, $R^3$ is —OH, $R^4$ is —NH—CH$_2$—CH$_2$—OH, and n is 370 to 380; or in the formula I, $R^1$ is —CH$_2$—COOH, $R^2$ is —NH—CH$_2$—CH$_2$—NH$_2$, $R^3$ is —OH, $R^4$ is —NH—CH$_2$—CH$_2$—NH$_2$, and n is 380 to 390; or in the formula I, $R^1$ is —H, $R^2$ is —NH—CH$_2$—CH$_2$—NH$_2$, $R^3$ is —OH, $R^4$ is —N—(CH$_2$—CH$_2$—OH)$_2$, and n is 390 to 400.

9. A plugging agent, wherein the plugging agent is the asphalt-like material of claim 1.

10. The plugging agent of claim 9, wherein in the formula I, $R^1$ is —COOH, $R^2$ is —NH—CH$_2$—CH$_2$—OH, $R^3$ is —OH, $R^4$ is —NH—CH$_2$—CH$_2$—OH, and n is 370 to 380; or in the formula I, $R^1$ is —CH$_2$—COOH, $R^2$ is —NH—CH$_2$—CH$_2$—NH$_2$, $R^3$ is —OH, $R^4$ is —NH—CH$_2$—CH$_2$—NH$_2$, and n is 380 to 390; or in the formula I, $R^1$ is —H, $R^2$ is —NH—CH$_2$—CH$_2$—NH$_2$, $R^3$ is —OH, $R^4$ is —N—(CH$_2$—CH$_2$—OH)$_2$, and n is 390 to 400.

11. A water-based drilling fluid, comprising water, bentonite, a pH regulator, a polymer viscosifying and filtration additive, a filtrate reducer, an inhibitor, KCl, a plugging agent, and a weighting agent, wherein the plugging agent is the asphalt-like material of claim 1.

12. The water-based drilling fluid of claim 11, wherein based on a mass of water, the bentonite is in an amount of 2.0% to 3.0% by mass, the pH regulator is in an amount of 0.5% to 1.0% by mass, polymer viscosifying and filtration additive is in an amount of 0.5% to 1.0% by mass, the filtrate reducer is in an amount of 2.0% to 4.0% by mass, the inhibitor is in an amount of 1.0% to 2.0% of by mass, KCl is in an amount of 5.0% to 7.0% by mass, the plugging agent is in an amount of 2.0% to 4.0% by mass, and the weighting agent is in an amount of 45.0% to 80.0% by mass.

13. The water-based drilling fluid of claim 11, wherein in the formula I, $R^1$ is —COOH, $R^2$ is —NH—CH$_2$—CH$_2$—OH, $R^3$ is —OH, $R^4$ is —NH—CH$_2$—CH$_2$—OH, and n is 370 to 380; or in the formula I, $R^1$ is —CH$_2$—COOH, $R^2$ is —NH—CH$_2$—CH$_2$—NH$_2$, $R^3$ is —OH, $R^4$ is —NH—CH$_2$—CH$_2$—NH$_2$, and n is 380 to 390; or in the formula I, $R^1$ is —H, $R^2$ is —NH—CH$_2$—CH$_2$—NH$_2$, $R^3$ is —OH, $R^4$ is —N—(CH$_2$—CH$_2$—OH)$_2$, and n is 390 to 400.

* * * * *